US012737128B2

(12) United States Patent
Sharon et al.

(10) Patent No.: US 12,737,128 B2
(45) Date of Patent: Sep. 15, 2026

(54) DATA STORAGE DEVICE AND METHOD FOR BIT ERROR RATE (BER) BALANCING BASED ON DYNAMIC SENSE TIME

(71) Applicant: Sandisk Technologies, Inc., Milpitas, CA (US)

(72) Inventors: Eran Sharon, Rishon Lezion (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 9 days.

(21) Appl. No.: 19/035,315

(22) Filed: Jan. 23, 2025

(65) Prior Publication Data

US 2026/0211558 A1 Jul. 23, 2026

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
USPC .......................................................... 711/103
See application file for complete search history.

(56) References Cited

U.S. PATENT DOCUMENTS 8,996,793 B1 3/2015 Steiner
9,395,927 B2 7/2016 Pekny
10,101,931 B1 * 10/2018 Camp ................. G06F 12/0866
11,853,572 B2 12/2023 Gopalakrishnan et al.
2014/0013033 A1 1/2014 Sharon
2014/0157086 A1 6/2014 Sharon
2014/0281820 A1 * 9/2014 Alrod ..................... G11C 16/10 714/773
2015/0378801 A1 12/2015 Navon
2021/0132818 A1 5/2021 Hallak et al.
2021/0406121 A1 * 12/2021 Sharon ................ G06F 11/3037

(Continued)

FOREIGN PATENT DOCUMENTS

KR 101206820 6/2012

OTHER PUBLICATIONS

U.S. Appl. No. 19/035,262, filed Jan. 23, 2025 entitled “Data Storage Device and Method for Non-Balanced Mapping for Variable Read Resolution.”

(Continued)

*Primary Examiner* — Mardochee Chery
(74) *Attorney, Agent, or Firm* — Crowell & Moring LLP

(57) ABSTRACT

When data is stored in a multi-level memory, the bit error rate among the various pages in the memory may be unbalanced. Different read-sense timings can be applied to different logical pages to mitigate this problem. More specifically, the sense time used to read a page can be based on a number of read thresholds involved in reading the page. For example, in quad-level cells (QLCs) configured to store top, upper, middle, and lower pages of data, and the sensing times for the top, upper, middle, and lower pages can progressively increase. Dynamically adjusting a voltage stabilization period of a read voltage can significantly reduce read latency and power consumption, which may be desired, for example, when retrieving data at multiple read resolutions or when supporting page-by-page programming.

20 Claims, 7 Drawing Sheets

(56) References Cited

U.S. PATENT DOCUMENTS

2025/0299745 A1* 9/2025 Yamaki .................. G11C 16/08

OTHER PUBLICATIONS

U.S. Appl. No. 18/945,932, filed Nov. 13, 2024 entitled "Data Storage Device and Method for Direct Data Quantization in Multi-Level-Cell Memory."

U.S. Appl. No. 18/230,576, filed Aug. 4, 2023 entitled "Computational Storage Device with Computation Precision-Defined Fixed Point Data Grouping and Storage Management."

Courbariaux, Matthieu et al.; "Binarized Neural Networks: Training Neural Networks with Weights and Activations Constrained to +1 or −1"; downloaded from the Internet on Jan. 23, 2025 at https://arxiv.org/abs/1602.02830; arXiv:1602.02830; Feb. 9, 2016; 11 pages.

Jiang, Chutian; "Efficient Quantization Techniques for Deep Neural Networks"; downloaded from the Internet on Jan. 23, 2025 at https://ieeexplore.ieee.org/document/9707043; 2021 International Conference on Signal Processing and Machine Learning (CONF-SPML); Stanford, California; Nov. 14, 2021; 7 Pages.

Mishra, Rahul et al.; "A Survey on Deep Neural Network Compression: Challenges, Overview, and Solutions"; downloaded from the Internet on Jan. 23, 2025 at https://arxiv.org/abs/2010.03954; arXiv:2010.03954; October 5, 2020; 19 pages.

Peng, Fu et al.; "Training Quantized Deep Neural Networks Via Cooperative Coevolution"; downloaded from the Internet on Jan. 23, 2025 at https://arxiv.org/pdf/2112.14834; arXiv:2112.14834V3; InInternational Conference on Sensing and Imaging; Jun. 26, 2022; 13 pages.

"Quantization"; Guidance documentation webpage; downloaded from the Internet on Jan. 23, 2025 at https://pytorch.org/docs/stable/guantization.html; The Linux Foundation, PyTorch Contributors; 2023; 15 pages.

Brookes, Tim; "What is Dynamic Resolution Scaling (DRS)?"; downloaded from the Internet on Nov. 13, 2024 at https://www.howtogeek.com/764408/what-is-dynamic-resolution-scaling-drs/; Nov. 14, 2021; How-To Geek; Valnet Publishing Group; 8 pages.

Ponti, M. et al.; "Compact Color Features with Bitwise Quantization and Reduced Resolution for Mobile Processing"; downloaded from the Internet on Nov. 13, 2024 at Ponti_MobileImagingSIP2013.pdf; InProceedings 2013; 4 pages.

"TensorFlow: An end-to-end platform for machine learning"; product page; downloaded from the Internet on Nov. 13, 2024 at https://www.tensorflow.org; Oct. 28, 2024; 10 pages.

Wang, Cheng et al.; "Channel Modeling and Quantization Design for 3D NAND Flash Memor"; Entro , vol. 25; Jun. 21, 2023; 17 pages.

Notice of Allowance mailed Mar. 23, 2026 in U.S. Appl. No. 19/035,252.

* cited by examiner 4-3-4-4 BER-Balanced Mapping 1-2-4-8 Non-Balanced Mapping

DATA STORAGE DEVICE AND METHOD FOR BIT ERROR RATE (BER) BALANCING BASED ON DYNAMIC SENSE TIME

BACKGROUND

A memory of a data storage device can contain memory cells that store more than one bit of data per cell. For example, a quad-level cell (QLC) can store four bits of data. The four bits of data in a QLC cell belong to four pages (a lower page, a middle page, an upper page, and a top page), and a mapping can be used to store data in the various logical pages. For example, using a 4-4-3-4 mapping, the data is written into a QLC cell in such a way that the lower, middle, and top pages can be read by sensing the cell voltage in four steps, whereas the upper page can be read by sensing the cell voltage in three steps. With this mapping, the number of transitions between adjacent states is divided approximately equally between the logical pages. This mapping can be used to balance the bit error rate (BER) among the pages.

DETAILED DESCRIPTION

The following embodiments generally relate to a data storage device and method for bit error rate (BER) balancing based on dynamic sense time. In one embodiment, a data storage device is provided comprising a memory comprising multi-level memory cells and one or more processors. The one or more processors, individually or in combination, are configured to: determine a sensing time to read one of the plurality of pages based on a number of read thresholds involved in reading the one of the plurality of pages; and read the one of the plurality of pages using the determined sensing time.

In another embodiment, a method is provided that is performed in a data storage device comprising multi-level memory cells. The method comprises: storing a plurality of pages of data in the memory using a mapping that results in an unbalanced bit error rate (BER) among the plurality of pages; and mitigating the unbalanced BER among the plurality of pages by dynamically adjusting a voltage stabilization period of a read voltage depending on which of the plurality of pages is being read.

In yet another embodiment, a data storage device is provided comprising: a memory comprising multi-level memory cells configured to store a plurality of pages of data; and means for reading one of the plurality of pages using a voltage stabilization time associated with the one of the plurality of pages, wherein each of the plurality of pages is associated with a different voltage stabilization time based on that page's bit error rate vulnerability.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
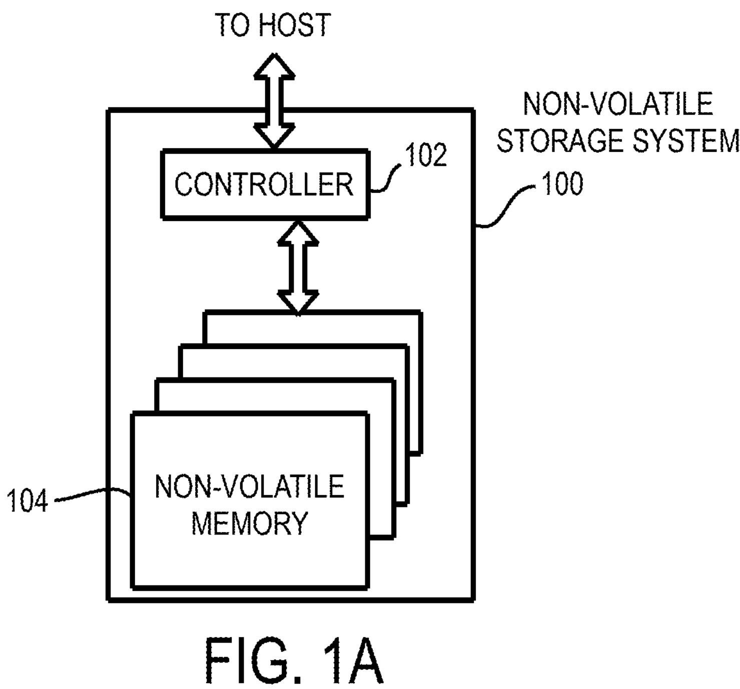
FIG. 1A is a block diagram of a data storage device of an embodiment.
Figure 1B:
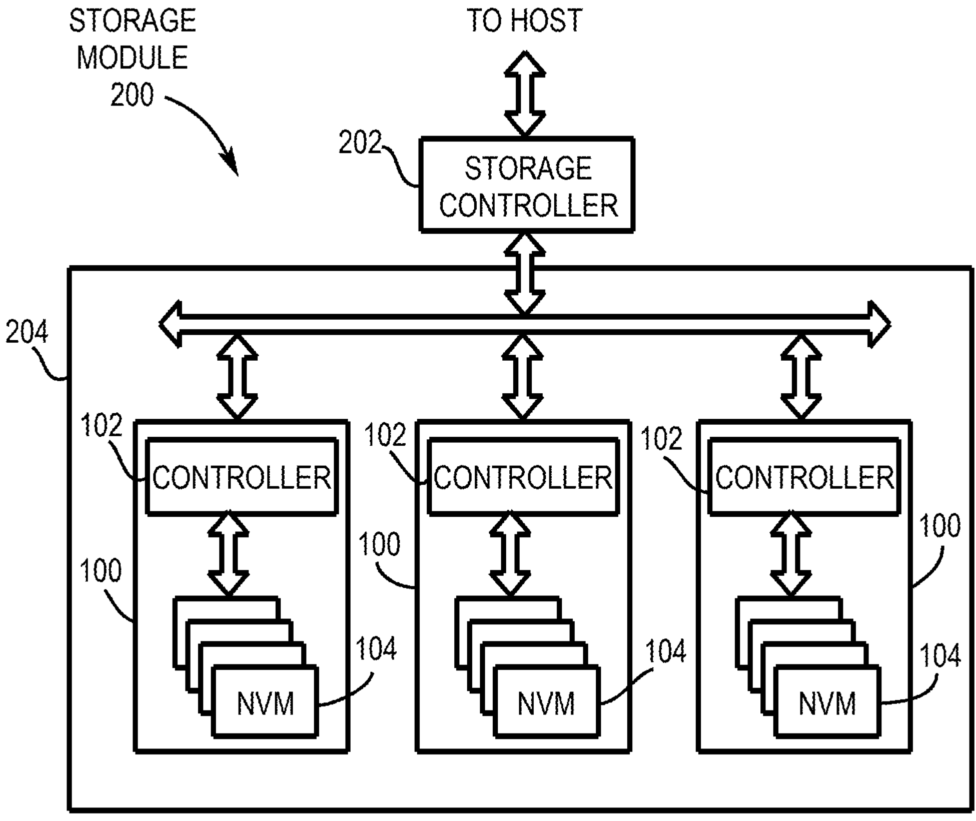
FIG. 1B is a block diagram illustrating a storage module of an embodiment.
Figure 1C:
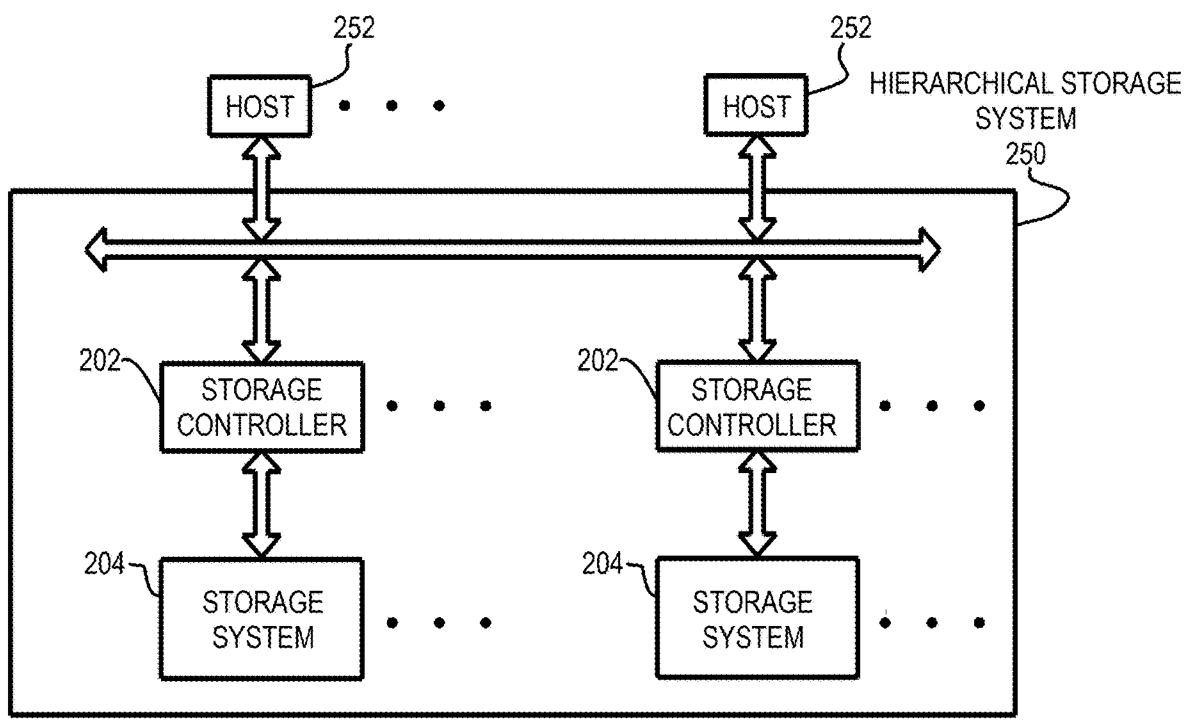
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
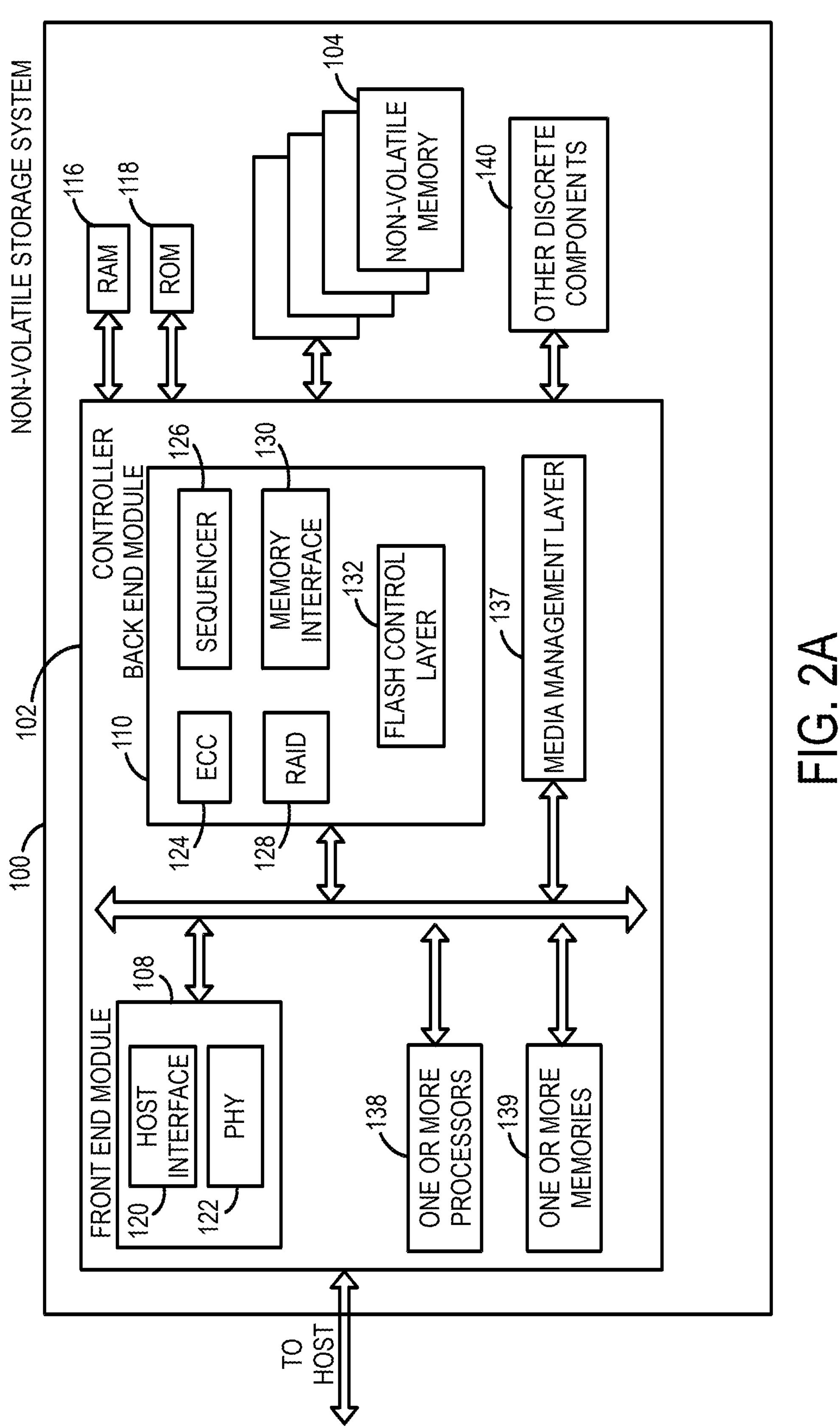
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
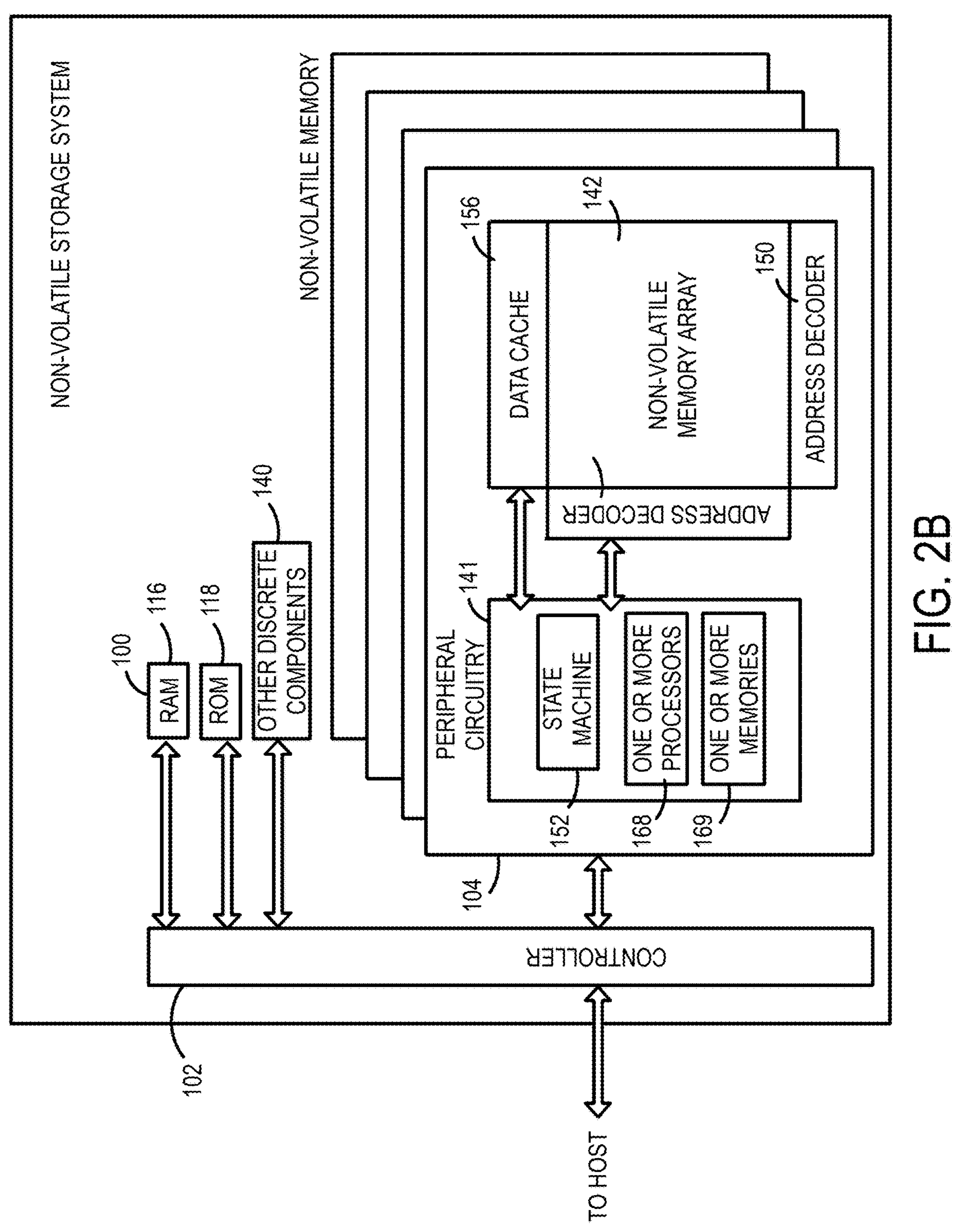
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
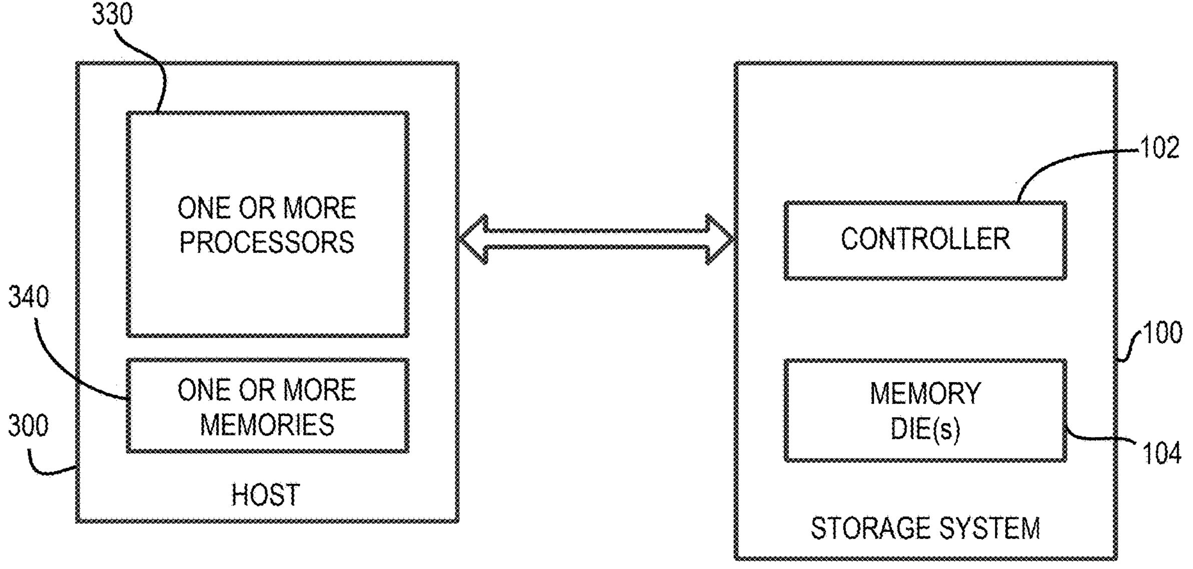
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In one embodiment, the memory 104 of the data storage device 100 can comprise matrices of storage (memory) cells. Each of these cells can be a single-level cell (SLC), which can store a single bit per cell. or a multi-level cell (MLC), which can store more than one bit per cell, based on the storage technology. When an MLC memory stores three or four bits per cell, the memory may be referred to as a triple-level cell (TLC) memory or a quad-level cell (QLC) memory, respectively. The following examples will be described in terms of QLC memory, but it should be understood that any suitable memory technology, now available or later developed, can be used. For example, other number of bits-per-cell technologies (e.g., TLC) can be used.

There are multiple ways to store and retrieve data in QLC cells, which can be organized in pages and blocks. In this example, the write and read operations are performed at a page level, and a page is 16 KB. Four bits in a QLC cell belong to four pages: a lower page, a middle page, an upper page, and a top page. With four 16 KB pages, each page can hold 4,096 samples of data, where each sample (e.g., a single element of a 32-bit vector) is 32 bits (i.e., each sample is stored in 32 cells, and each bit is stored in a separate cell). All four pages can be available when a write operation is performed in a QLC cell. The four-bit content of the QLC cell can be represented as a voltage value in the charge gate of the QLC cell. For example, a QLC partition can include 16 voltage levels arranged in four logical pages noted as lower, middle, upper, and top pages. This voltage representation of bit values can be arranged in such a way that the individual bits of the stored number can be detected in a minimum number of steps of voltage sense operations.

A logical bit mapping (coding scheme) can be used to store data in the various logical pages of a multi-bit memory cell. For example, bit error rate (BER) balanced mapping can be used to equalize both the reliability of the logical pages (i.e., the vulnerability of the different logical pages to erroneous bit-flips) and the latency of the read from the different logical pages. For example, a 4-4-3-4 coding mechanism is a standard bit mapping for a QLC cell (e.g., used in a BiCS5 memory array). In a 4-4-3-4 coding mechanism, the data is written into a QLC cell in such a way that the lower, middle, and top pages can be read by sensing the cell voltage in four steps, whereas the upper page can be read by sensing the cell voltage in three steps. This standard mapping can be a Gray mapping in which the bits representative of adjacent states differs from each other only by one bit. This characteristic of Gray mapping also improves memory reliability.

Figure 4:
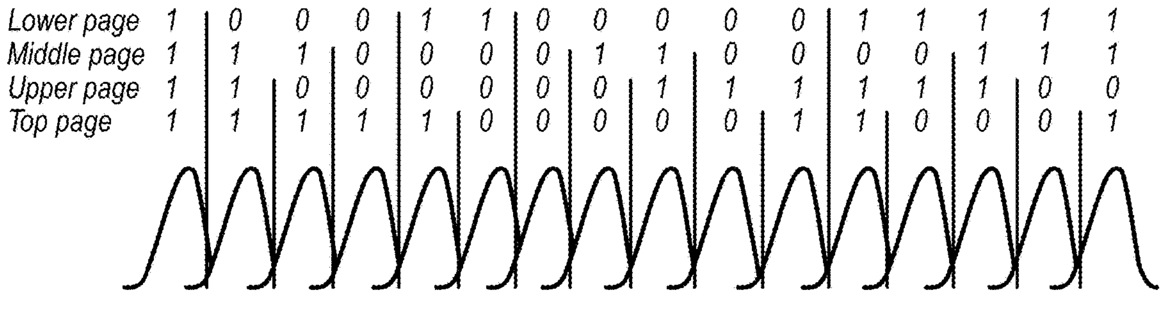
FIG. 4 is an illustration of a 4-3-4-4 bit error rate (BER) balanced mapping of an embodiment.

FIG. 4 is an illustration of a 4-3-4-4 bit error rate (BER) balanced mapping of an embodiment. As shown in FIG. 4, with standard Gray-codes BER balanced mapping, the number of transitions between adjacent states is divided approximately equally between the logical pages. This mapping has the advantages in terms of both reliability and latency. However, this "balanced" mapping is not really balanced in that the middle page has three transitions while the other pages have four transitions. Since the vulnerability of the data to errors is set according to the "weakest link" (i.e., according to the cells of the logical page with the highest BER), the inventors have recognized that there is a need to mitigate the inherent BER difference between the logical pages in a "balanced" mapping. It should be noted that while a 4-3-4-4 mapping is used in this example, other fairly-balanced mappings can be used.

Figure 5:
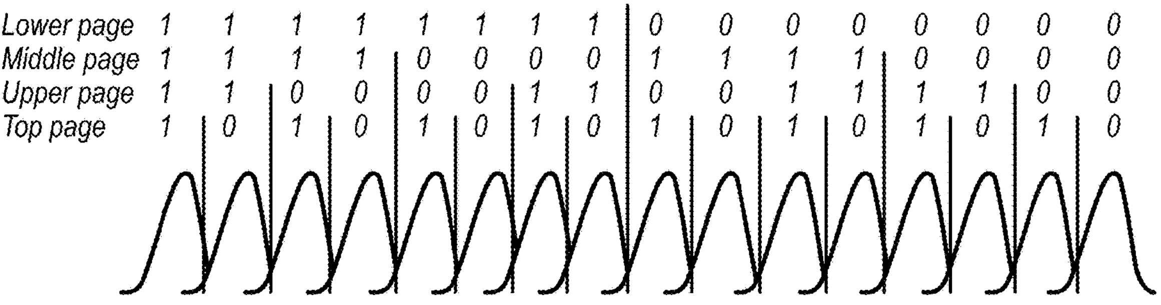
FIG. 5 is an illustration of a 1-2-4-8 non-balanced mapping of an embodiment.

With non-balanced mappings, the importance of mitigating the different BERs associated inherently with the different logical pages is even greater. FIG. 5 is an example of non-balance mapping (here, a 1-2-4-8 mapping). As shown in FIG. 5, with this mapping, the lower page has only one transition between adjacent states, the middle page has two transitions, the upper page has four transitions, and the top page has eight transitions. This 1-2-4-8 mapping includes one sense operation for the lower page, two sense operations for the middle page, four sense operations for the upper page, and eight sense operations for the top page. Such mapping can result in non-equal properties of the logical pages. As a logical page can have a higher number of transitions between zeros and ones, it can have a greater vulnerability to bit errors as well as a higher read latency (due to the higher number of related sense operation that are required to read its data).

While balanced mapping has advantages in terms of reliability, non-balanced mapping can provide advantages of significantly reduced latency and power consumption, which may be desired in several applications. For example, non-balanced mapping can be used to allow a faster read operation (with different gears of data resolution) as described in "Data Storage Device and Method for Non-Balanced Mapping for Variable Read Resolution," U.S. patent application Ser. No. 19/035,262, filed on Jan. 23, 2025 (now U.S. Pat. No. 12,619,533), which is hereby incorporated by reference. As another example, non-balanced mapping can be used to supporting page-by-page programming, which reduces the need for buffering large amounts of data.

Non-BER-balanced logical pages can hurt the overall immunity of the memory to BER. This is because data is usually placed across the logical pages (i.e., data is divided equally among the lower, middle, upper, and top pages), and the ability to retrieve the data reliably is determined by the BER of the worst page. The BER level of the data not only limits the immunity to uncorrectable error correction code (UECC) events, but it also affects the frequency of applying high gear decoding (noted sometimes as "FP-mode"), which is translated to higher decoding latency and higher power consumption.

Several countermeasures can be used to handle logical pages with a non-balanced inherent BER. For example, one option is to use a different parity allocation for each logical page. A higher allocation of redundant parity bits can allow use of codes with higher BER immunity. Such higher parity regions can be allocated to the logical pages with a higher inherent BER. For example, with reference to the 4-3-4-4 mapping of FIG. 4, more parity can be allocated to the lower, upper, and top pages than to the middle page. However, an inherent drawback to this approach is the complexity (and system overhead and inefficiency) of handling different codes at once.

Another option is to place the verify levels of the different states in a non-uniform manner. That way, the voltage states of more BER-vulnerable logical pages can be placed farther away from each other such that the amount of state overlap is reduced. However, this approach can require very careful fine-tuning and might negatively affect the BER of other pages. Moreover, due to the voltage drift of the memory over time (as well as an increased program-erase-count and/or decreased data retention), this gentle BER balancing tends to be unstable.

Yet another option is to simply leave the non-balanced BER as is and design an ECC solution according to the worst BER. However, this can require higher ECC over-provisioning and increase memory cost. Also, this approach may be acceptable for a fairly balanced Grey mapping (such as a 4-3-4-4 mapping), but it may be highly inefficient for non-balanced Grey mappings (such as a 1-2-4-8 mapping).

The following embodiments can be used to provide an alternative solution to handle and mitigate unbalanced BER balancing that tackles this challenge from a different perspective. More specifically, in one embodiment, BER balancing is based on applying different read-sense timings to the different logical pages.

By way of background, the read operation of data from a NAND memory is done by applying voltage (Vcg) on the cells. The major part of the read operation is a voltage stabilization period, which is derived by the physical phenomena of resistive-capacitive (RC) delay. After the Veg applied on the cell is stabilized, there is also another (shorter) time (a sensing integration period) during which the sense amplifiers integrate the current flow through the memory cell as an indication of the cell voltage level. The measured BER decreases along the time elapsed during the voltage stabilization period until its value stabilizes, as shown in the graph in FIG. 6.

In one embodiment, the controller 102 of the data storage device 100 is configured to set the length of the voltage stabilization period according to the inherent BER vulnerability of the different logical pages. That is, the timing used for sensing a specific page can be a function of the number of read thresholds involved in reading the page. A page involving a higher number of read thresholds can use a more-relaxed timing for sensing (to provide a longer voltage stabilization time), which can lead to minimizing its BER. A page involving a smaller number of read thresholds can use a more-aggressive timing for sensing (to provide a shorter voltage stabilization time), which can lead to increasing its BER while reducing the page read latency. Overall, the use of this embodiment can lead to BER equalization across the pages, while further minimizing the read latency of the pages involving a smaller number of read thresholds. This provides a benefit to a data storage device that supports retrieving data at multiple read resolutions, as referenced above. For example, low-resolution data that is frequently accessed (e.g., low resolution weights of a large language model (LLM) or a low-resolution image) can be stored in a page involving a small number of read thresholds and, hence, can benefit from low read latency. High resolution data, which is usually more-rarely accessed (e.g., high resolution weights of an LLM or a high-resolution version of an image)) can be stored in a page involving a large number of read thresholds and, hence, can require higher read latency (which may be acceptable as it is accessed more rarely).

For example, the 1-2-4-8 non-balanced mapping shown in FIG. 5 includes an inherent phenomena of non-equal BER in the different logical pages, where the lower page has the lowest BER, the middle page has a higher BER, the upper page has an even larger BER, and the top page has the highest BER. In order to equalize the BER of the different logical pages, possibly in conjunction with other known methods for BER equalization (such as verify levels optimization or different parity allocation per page), the controller 102 in this embodiment can use different durations T of the voltage stabilization periods for the different pages, such that $T_{Top}>T_{Upper}>T_{Middle}>T_{Lower}$, where T indicates here the sensing time of the page. T may be controlled via the sensing voltage stabilization period.

Figure 6:
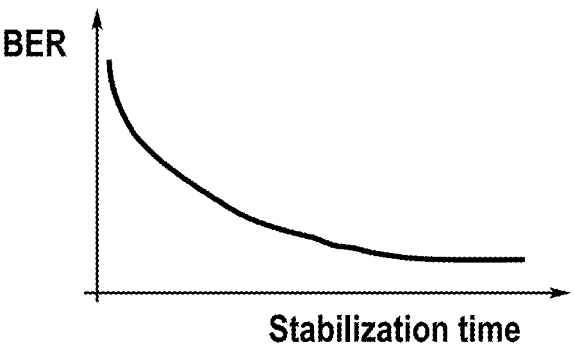
FIG. 6 is a graph of BER versus stabilization time of an embodiment.

In one embodiment, the relations between the $T_{Top}/T_{Middle}/T_{Upper}/T_{Lower}$ can be set in a fixed manner in advance according to a typical relation of the BER of the different pages and the stabilization period (as in the graph of FIG. 6, for example). These relations between the sense timings of the logical pages can be tuned in advance to change along with the lifetime of the data storage device 100 or as a function of other operational parameters that affect the device BER. For example, different timings can be set according to program-erase count (PEC), read/write temperatures, TimePool (TMPL), etc. In another embodiment, the stabilization periods can be tuned adaptively via feedback from the controller 102 in accordance with the observed BER (or syndrome weight) of the different logical pages.

Figure 7:
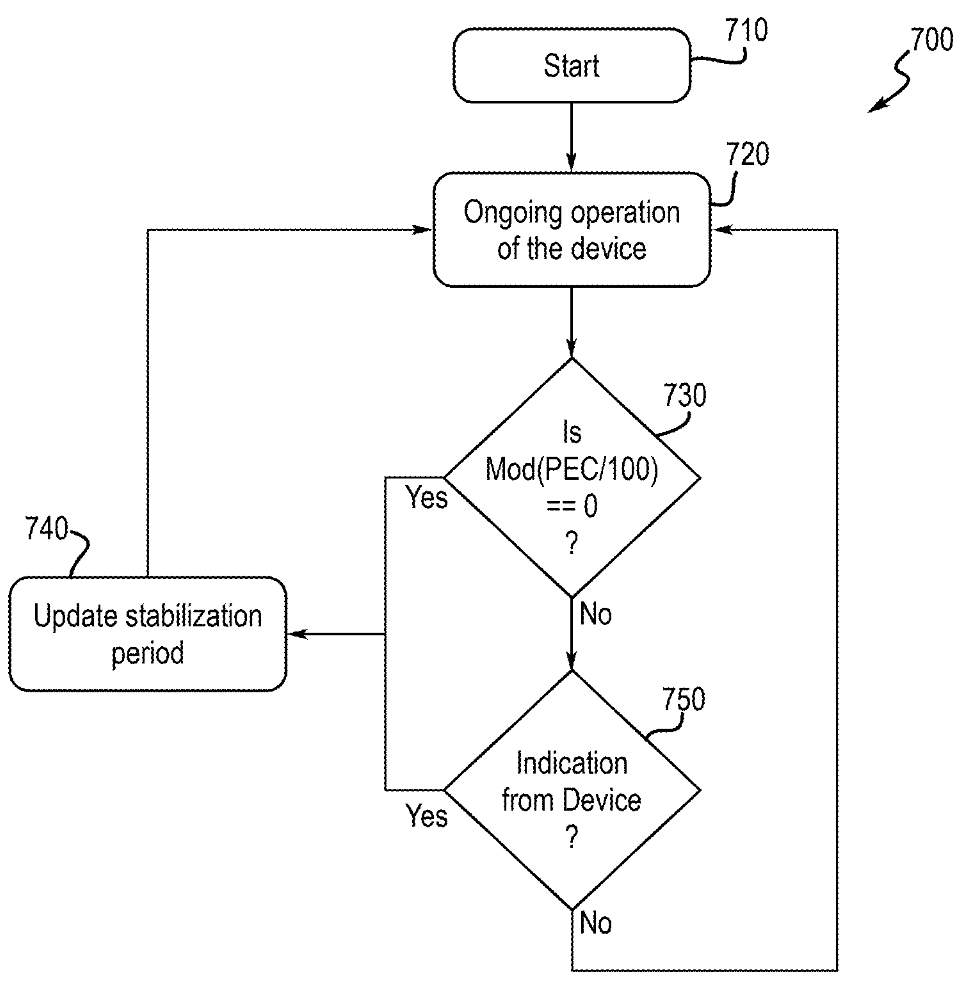
FIG. 7 is a flow chart of a method of an embodiment for BER balancing based on dynamic sense time.

Turning again to the drawings, FIG. 7 is a flow chart 700 of a method of an embodiment for adaptive setting of the stabilization periods for equalizing non-BER-balanced mapping. The method starts (710) from default voltage stabilization periods. For example, for a 1-2-4-8 mapping, $T_{Top}>T_{Upper}>T_{Middle}>T_{Lower}$, where T indicates the sensing time of a page. In this example, during the ongoing operation of the data storage device 100, the controller 102 of the data storage device 100 determines of the Mod(PEC/100) is zero (730). If Mod(PEC/100) is zero, the controller 102 updates the stabilization periods (740). The update of the stabilization periods can be done in a fixed manner (i.e., set in advance) according to several parameter values, such as, but not limited to program-erase count or time-pool values (e.g., exceptional X-Temp values, etc.).

If Mod(PEC/100) is not zero, the controller 102 determines if there is an indication from the data storage device 100 for a need to adjust the stabilization periods (750). This need can be initiated, for example, by observing exceptional BER, syndrome weights, and/or decoding durations for different logical pages. If there is an indication from the data storage device 100, the controller 102 updates the stabilization periods, as discussed above (740). If there is not an indication from the data storage device 100, the controller 102 continues its ongoing operations of the data storage device 100 (720).

There are several advantages associated with these embodiments. For example, these embodiments can be used to help to equalize the BER of the different logical pages without the need to use complex solutions, such as different ECC redundancy for the logical pages. This can be especially beneficial in supporting multiple data retrieval resolutions, as referenced above. Also, using these embodiments to balance BER can increase performance and reduce cost.

Further, it should be noted that the embodiments described herein can be used alone or in combination with other BER balancing countermeasure (such as, but not limited to, the countermeasures described above). Combining BER balancing countermeasure can provide advantages (e.g., when there is a need to address this issue in import and complex situations).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a memory comprising multi-level memory cells configured to store a plurality of pages of data; and one or more processors, individually or in combination, configured to:

read the plurality of pages by, for each page, applying a voltage on memory cells of the page and sensing the memory cells after a voltage stabilization period has lapsed;

determine a bit error rate for each page of the plurality of pages; and in response to determining that a first page of the plurality of pages has a greater bit error rate than a second page of the plurality of pages, use a longer voltage stabilization period when reading the first page than when reading the second page to decrease the bit error rate in the first page.

2. The data storage device of claim 1, wherein the multi-level memory cells comprise quad-level cells (QLCs) configured to store top, upper, middle, and lower pages of data.

3. The data storage device of claim 2, wherein an unbalanced bit error rate among the top, upper, middle, and lower pages of data is caused by a 4-4-3-4 mapping.

4. The data storage device of claim 2, wherein an unbalanced bit error rate among the top, upper, middle, and lower pages of data is caused by a 1-2-4-8 mapping.

5. The data storage device of claim 2, wherein sensing times for the top, upper, middle, and lower pages progressively increase.

6. The data storage device of claim 1, wherein a length of the longer voltage stabilization period is predetermined.

7. The data storage device of claim 1, wherein a length of the longer voltage stabilization period is dynamically adjusted.

8. The data storage device of claim 7, wherein the length of the longer voltage stabilization period is dynamically adjusted based on a program-erase count, a read/write temperature, and/or a timepool parameter.

9. The data storage device of claim 1, wherein the one or more processors, individually or in combination, are further configured to support retrieving data at multiple read resolutions.

10. The data storage device of claim 1, wherein the memory comprises a three-dimensional memory.

11. In a data storage device comprising multi-level memory cells, a method comprising:

storing a plurality of pages of data in the memory using a mapping;

reading the plurality of pages by, for each page, applying a voltage on memory cells of the page and sensing the memory cells after a voltage stabilization period has lapsed;

determining a bit error rate (BER) for each page of the plurality of pages;

in response to determining that a first page of the plurality of pages has a greater bit error rate than a second page of the plurality of pages, using a longer voltage stabilization period when reading the first page than when reading the second page to decrease the bit error rate in the first page.

12. The method of claim 11, wherein a length of the voltage stabilization period is dynamically adjusted based on a program-erase count, read/write temperature, and/or a timepool parameter.

13. The method of claim 11, wherein a length of the voltage stabilization period is dynamically adjusted based on an observed bit error rate and/or an observed syndrome weight.

14. The method of claim 11, wherein the mapping comprises a 4-4-3-4 mapping.

15. The method of claim 11, wherein the mapping comprises a 1-2-4-8 mapping.

16. The method of claim 11, further comprising performing an operation to further mitigate an unbalanced BER among the plurality of pages.

17. The method of claim 16, wherein the operation comprises using a different parity allocation for each of the plurality of pages.

18. The method of claim 16, wherein the operation comprises using a different verify level for each of the plurality of pages.

19. The method of claim 16, wherein the operation comprises using an error correction code that is designed for a worst BER in the plurality of pages.

20. A data storage device comprising:

a memory comprising multi-level memory cells configured to store a plurality of pages of data; and means for:

reading the plurality of pages by, for each page, applying a voltage on memory cells of the page and sensing the memory cells after a voltage stabilization period has lapsed;

determining a bit error rate for each page of the plurality of pages; and in response to determining that a first page of the plurality of pages has a greater bit error rate than a second page of the plurality of pages, using a longer voltage stabilization period when reading the first page than when reading the second page to decrease the bit error rate in the first page.

* * * * *